United States Patent [19]

Nakamura et al.

[11] 4,033,682

[45] July 5, 1977

[54] EXPOSURE QUANTITY CONTROL CIRCUIT

[75] Inventors: Yukio Nakamura, Yotsukaido; Shougo Kato, Chiba; Shinji Nagaoka, Yotsukaido, all of Japan

[73] Assignee: Seiko Koki Kabushiki Kaisha, Japan

[22] Filed: July 15, 1975

[21] Appl. No.: 596,018

[30] Foreign Application Priority Data

July 15, 1974  Japan ............................ 49-83556
July 15, 1974  Japan ............................ 49-83557

[52] U.S. Cl. ............................ 352/235; 354/50; 354/51; 354/60 R; 354/234
[51] Int. Cl.² ............................ G03B 9/08
[58] Field of Search ............ 354/50, 51, 60 R, 234, 354/235

[56] References Cited
UNITED STATES PATENTS

| | | | |
|---|---|---|---|
| 3,487,757 | 1/1970 | Kiper | 354/51 |
| 3,682,058 | 8/1972 | Wada | 354/51 |
| 3,683,767 | 8/1972 | Sahara | 354/51 |
| 3,721,166 | 3/1973 | Yanagi et al. | 354/51 |
| 5,953,867 | 4/1976 | Kondo | 354/50 |

*Primary Examiner*—Russell E. Adams
*Attorney, Agent, or Firm*—Robert E. Burns; Emmanuel J. Lobato; Bruce L. Adams

[57] ABSTRACT

An electric shutter is opened and closed to effect an exposure in dependence upon the energization of an electromagnet. A switching circuit controls the energization of the electromagnet in accordance with various exposure information, such as diaphragm setting and film sensitivity. An exposure control circuit comprised of a series connection of a diode and a variable resistor is connected in parallel with the electromagnet and adjustably controls the time at which the electromagnet is deenergized to accordingly effect closing of the shutter such that the electromagnet delay time equals the shutter sector advancing time to thereby compensate for fluctuations between the two times.

1 Claim, 5 Drawing Figures

EXPOSURE QUANTITY CONTROL CIRCUIT

BACKGROUND OF THE INVENTION

This invention relates to an electric shutter control device of a camera. As is commonly known, in order to electrically control the mechanical closing time of the sector by means of an electromagnet or the like in an electric shutter it is necessary to turn on and off the control circuit for said electromagnet in accurate synchronization with the opening and closing opertion of the sector. In this case it is essential to suitably select the time duration from the time when the electric circuit starts operating until the sector has been opened (sector advancing time) and the time duration from the time when a reversing signal is developed from the control circuit until the sector has been closed (electromagnet delay time). The sector advancing time is generally longer than the electromagnet delay time and therefore it is necessary that the control time determined by the control circuit is selected to be longer than the exposure time to be realized. Moreover, these times vary for different shutters due to the nonuniformity of the mechanical inertia and the holding force of the electromagnet umployed.

To solve the above-mentioned problem, a method has been proposed heretofore to serially connect an adjustable resistor to the timing circuit and thereby correct the control time by always adding a constant time corresponding to the difference between the sector advancing time and the electromagnet delay time to said control time. This method can be used when exposure factor informations, such as diaphragm aperture, are introduced through a diaphragm or filter disposed in front of the light receiving portion, but not when the exposure factor informations are introduced by means of resistors which vary the switching level of the switching circuit. This is because the time to be corrected varies with the variation of the switching level.

In view of the foregoing, according to one embodiment of this invention an exposure time adjusting circuit composed of a serial connection of a diode and an varies resistor is connected in parallel to the electromagnet used for controlling the sector closing operation to thereby control the electromagnet delay time until it becomes equal to the sector advancing time. According to another embodiment of this invention a delay circuit composed of a transistor, a capacitor and adjustable resistors is arranged between the output terminal of the switching circuit and the electromagnet to thereby control the electromagnet delay time until it becomes equal to the sector advancing time. With such arrangements it is possible to match the exposure time with the control circuit irrespective of what method is employed for introducing the exposure factor informations, such as diaphragm aperture, etc. The circuit of this invention is applicable especially when a shutter is arranged in the exchangeable objective and the control circuit is accomodated within the camera body, because the circuit of this invention can compensate the nonuniformity of time adjusted by different shutters.

Figure 1:
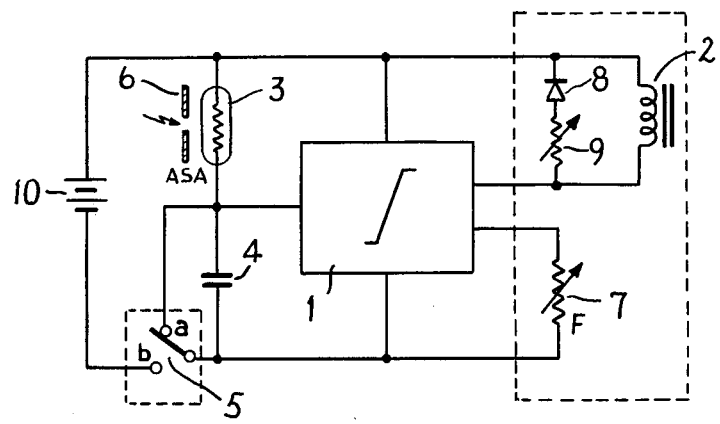
FIG. 1 is a circuit diagram of one embodiment of exposure control circuit according to the invention.

DETAILED DESCRIPTION OF PREFERRED EMBODIMENTS:

In FIG. 1, indicated at 1 is a switching circuit composed of a known Schmitt circuit, 2 is an exposure controlling electromagnet, 3 is a photoconductive element, an 4 is a capacitor which, in combination with said photoconductive element 3, forms a timing circuit. A trigger switch 5 is displacable in association with a sector opening member from $a$ to $b$ and in association with a sector closing member from $b$ to $a$, a diaphragm or filter 6 is disposed in front of a light receiving portion adapted to introduce information representative of film sensitivity, 7 is a resistor adapted to introduce exposure information such as diaphragm value, 8 is a diode which forms the exposure time adjusting circuit, 9 is a variable resistor arranged in said exposure time adjusting circuit and 10 is a power source.

Figure 2:
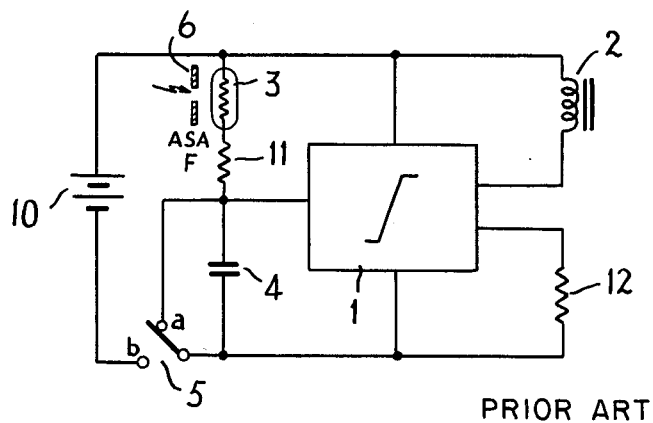
FIG. 2 is a circuit diagram of a typical prior art exposure control circuit.
Figure 3:
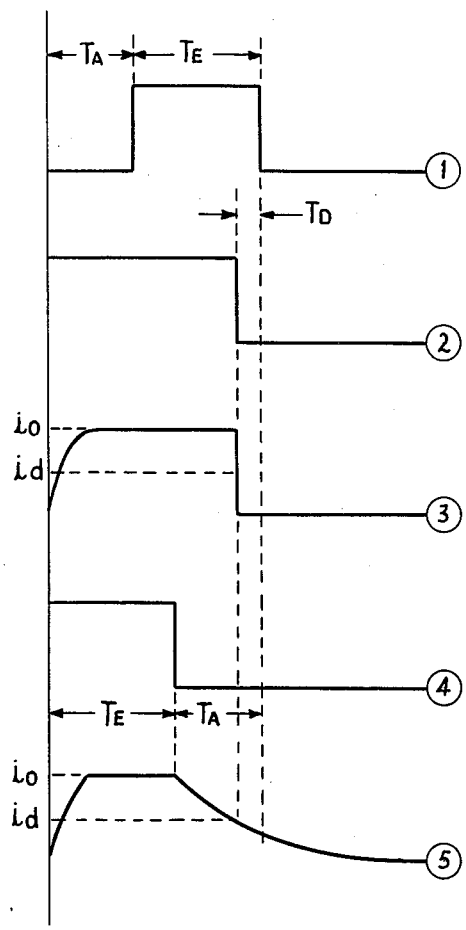
FIG. 3 is a set of waveforms for explaining the operation of the FIG. 1 circuit.

In FIG. 2 like parts are indicated with like numerals as those used in FIG. 1 and resistors are indicated at 11 and 12. Referring to FIG. 3, represented at ① is a shutter opening operation, ② is an output waveform from the conventional prior art switching circuit 1 shown in FIG. 2, ③ is a waveform of the current flowing through the electromagnet 2 arranged in the conventional circuit as shown in FIG. 2, ④ is an output waveform from the switching circuit 1 according to one embodiment of this invention as shown in FIG. 1 and ⑤ is a waveform of the current flowing through the electromagnet according to one embodiment of this invention as shown in FIG. 1.

As mentioned hereinbefore, it is most essential to suitably select a time duration starting at the time when the power is supplied to the control circuit by way of the trigger switch 5 and ending at the time when the sector is opened, or the sector advancing time TA, and to select an electromagnet delay time TD starting at the time when the electromagnet 2 is deenergized upon reversing the output from the switching circuit 1 and ending at the time when the sector is closed. Conventionally this time difference (TA−TD) has been used as an adjust time and for this purpose an adjustable resistor 11 is connected in series to the timing circuit (FIG. 2) so that the time obtained by adding said adjust time (TA−TD) to the exposure time TE to be realized has been controlled by the control circuit. This method, however, cannot be applied properly to the control circuit of FIG. 1 which is so constructed as to vary the switching level of the switching circuit 1 depending on the exposure factor information, such as diaphragm value because, in such a case, the adjust time fluctuates with the variation of the switching level and hence the intended purpose cannot be attained. According to this invention an exposure time adjusting circuit is composed of a serial connection of a diode 8 and an adjustable resistor 9 (FIG. 1) so that the electromagnet delay time is made coincident with said sector advancing time to compensate the fluctuation of the adjust time.

Now the embodiment of this invention shown in FIG. 1 will be described with respect to its operation. When the shutter starts operating, first the trigger switch 5 is switched over from *a* to *b* to establish a connection to the power source. At this moment the electromagnet 2 is energized through the switching circuit 1. On the other hand, the timing capacitor 4 begins to be charged by way of the photoconductive element 3 having a resistance which varies depending on the brightness of the subject. The information about the film sensitivity is introduced by the diaphragm 6 or filter disposed in front of the photoconductive element 3.

Now the sector is opened mechanically. So long as the electromagnet 2 is being energized, it prevents the operation of the sector closing member and therefore the shutter is held in its open position. The variable resistor 7 is adapted to determine the switching level of the switching circuit 1 and so constructed that the switching level can be adjusted properly depending on the lens aperture value. When the charged voltage across the timing capacitor 4 becomes equal to the switching level determined by the variable resistor 7 which is adapted to introduce the aperture information, the switching circuit 1 is reversed and develops an output waveform as shown in FIG. 3 at ④. In other words, when the informations about the brightness of the subject, film sensitivity and diaphragm aperture are introduced, an optimum exposure time TE is determined and developed automatically in the form of an electric signal. Upon reversing the switching circuit 1 and after deenergizing the electromagnet 2, a transient current *i* flows as shown in FIG. 1. This is a current converted from the energy which has been stored in the electromagnet during energizing the same, and may be expressed by the following formula:

$$i = i_0 e^{(-Rv + Rm_d/L)}$$

where,
*i* : transient current
$Rv$ : resistance of the variable resistor 9
$L$ : inductance of the electromagnet 2
$Rm$ : DC resistance of the electromagnet 2
$i_0$ : current flowing through the electromagnet 2 in a steady state The transient current *i* is represented by the attenuating curve portion of the current waveform ⑤ (FIG. 3). In this curve, $i_d$ represents a limit current with which the electromagnet 2 prevents the operation of the sector closing member, or the minimum current required for holding the sector closing member. When the current flowing through the electromagnet 2 is reduced less than $i_d$, then the sector closing member is released and closes the sector after a mechanical delay time or a conventional electromagnet delay time TD. Accordingly, the electric output signal from the control circuit is matched with the actual exposure time when both the sector advancing time and electromagnet delay time become TA and coincide with each other as shown in FIG. 3. The attenuation characteristic of said transient current *i* can be varied by adjusting the variable resistor 9 which is adapted for the adjustment of the electromagnet delay time. More specifically, the attenuation time and hence the electromagnet delay time become longer as the resistance of said variable resistor 9 is reduced; whereas they become shorter as the resistance of said variable resistor 9 is increased.

The operation of the conventional circuit shown in FIG. 2 will be apparent from the foregoing description about the operation of the circuit according to one embodiment of this invention and will not be described in detail herein. In the FIG. 2 circuit, the film sensitivity and diaphragm aperture are simultaneously introduced into the control circuit by means of a diaphragm or filter disposed in front of the photoconductive element 3. Furthermore, resistor 11 is connected in series to the timing circuit so that the time difference (TA−TD) between the sector advancing time TA and electromagnet delay time TD can be always added to the adjust time. A resistor 12 is adpated to determine the switching level of the switching circuit 1 and, in the embodiment of FIG. 2, it has to be a fixed resistor. This is because, when the switching level fluctuates, said adjust time also fluctuates and the control circuit cannot be matched with the actual exposure time as mentioned previously. The output waveform from the switching circuit 1 and the waveform of the current flowing through the electromagnet 2 are as shown in FIG. 3 at ② and ③ respectively, and only the mechanical delay time TD measured from the reversion of switching circuit 1 forms the electromagnet delay time.

Figure 4:
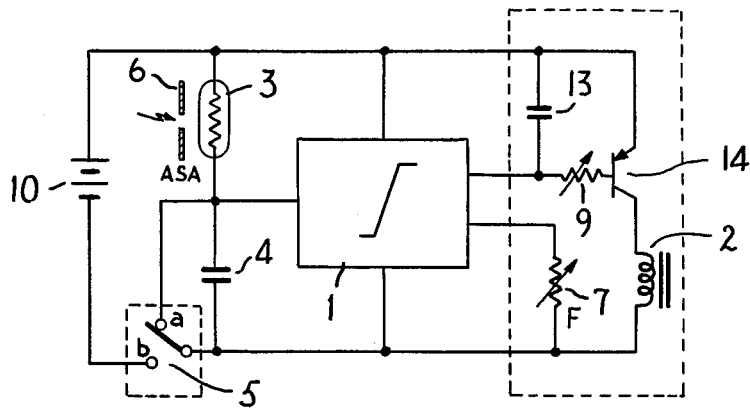
FIG. 4 is a circuit diagram of another embodiment of exposure control circuit according to the invention.
Figure 5:
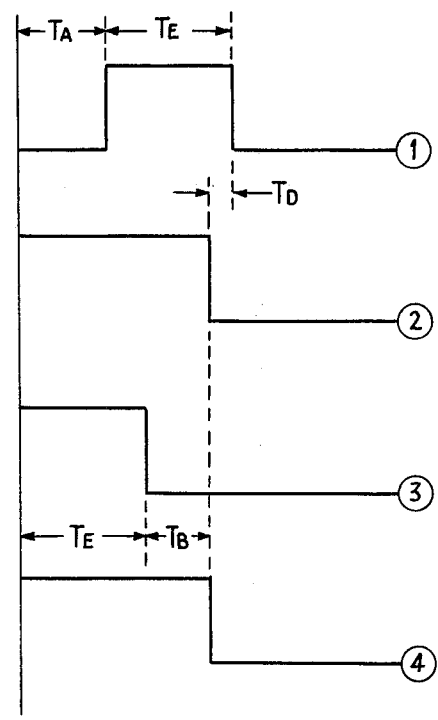
FIG. 5 is a set of waveforms for explaining the operation of the FIG. 4 circuit.

In FIG. 4 like parts are indicated with like numerals and 13 is a capacitor which forms a delay circuit, 9 is a resistor adapted to adjust the delay time, 14 is a transistor disposed in the delay circuit. Referring to FIG. 5, represented at ① is a shutter opening operation, ② is an output waveform from the conventional prior art switching circuit 1 shown in FIG. 2, ③ is an output waveform from the switching circuit 1 according to one embodiment of this invention shown in FIG. 4 and ④ is a waveform of the voltage developed across the electormagnet according to one embodiment of this invention.

Now the embodiment of this invention shown in FIG. 4 will be described with respect to its operation. When the shutter starts operating, first the trigger switch 5 is switched over from *a* to *b* to establish a connection to the power source. At this moment the base current of transistor 14 flows through the switching circuit 1 so that the transistor 14 becomes conducting to energize the electromagnet 2.

On the other hand, the timing capacitor 4 begins to be charged by way of photoconductive element 3 having a resistance which varies depending on the brightness of the subject. The information about the film sensitivity is introduced by the diaphragm 6 or filter disposed in front of the photoconductive element 3.

Now the sector is opened mechanically. So long as the electromagnet 2 is being energized, it prevents the operation of the sector closing member and therefore the shutter is held in its open position. The variable resistor 7 is adapted to determine the switching level of the switching circuit 1 and so constructed that the switching level can be adjusted properly depending on the lens aperture value. When the charged voltage across the timing capacitor 4 becomes equal to the switching level determined by the variable resistor 7 which is adapted to introduce the aperture information, the switching circuit 1 is reversed and develops an output waveform as shown in FIG. 5 at ③. In other words, when the informations about the brightness of the subject, film sensitivity and diaphragm aperture are introduced, an optimum exposure time TE is determined and developed automatically in the form of an electric signal. Upon reversing the switching circuit 1, the capacitor 13 in the delay circuit is discharged through the emitter and base of the transistor 14 and through the adjustable resistor 9 until the transistor 14 becomes non-conductive. This discharging time is determined depending on the capacity of the capacitor 13 and the resistance of the resistor 9. According to the shown embodiment, the delay time TB as shown in FIG. 5 at ④ is adjusted by the adjustable resistor 9. When the transistor 14 becomes non-conductive, the electromagnet 2 is deenergized and the sector is closed after a mechanical delay time TD. Accordingly, it becomes possible to match the electric output signal from the control circuit with the actual exposure time by adding the delay time TB to the adjust time (TA−TD) as shown in FIG. 5.

Thus according to this embodiment a delay circuit is arranged between the output terminal of the switching circuit and the electromagnet so that the time duration from development of a sector closing signal from the switching circuit until the sector has been closed can be adjusted. In other words, the present invention makes it possible to compensate the adjust time even with such a type of circuit that introduces the exposure factor informations by varying the switching level.

Thus according to this invention, the circuit adapted for adjusting the electromagnet delay time has a simple and inexpensive constuction and, when applied to such a circuit wherein the switching level of the switching circuit is varied depending on the exposure factor informations such as diaphragm aperture, etc., permits an accurate compensation of the fluctuation of the adjust time which occurs upon fluctuation of the switching level.

Furthermore in case the shutter is arranged in an exchangeable objective and a control circuit is accomodated within the camera body, if the adjust circuit of this invention is incorporated in the shutter, then the adjust time which varies for different shutters can be adjusted by means of the variable resistor 9.

We claim:

1. In a camera having an electric shutter operable from an initial closed state to an open state and then to a final closed state to effect an exposure: an electromagnet operable when deenergized to initiate closing of the shutter; a switching circuit connected to said electromagnet for controlling the energization of said electromagnet in accordance with preselected exposure information; and means including an adjustable exposure control circuit coacting with said switching circuit for adjustably controlling the time at which said electromagnet is deenergized such that the time period it takes said shutter from the moment of deenergization of said electromagnet to move from its open state to its final closed state substantially equals the time period it takes said shutter to move from its initial closed state to its open state, said adjustable exposure control circuit comprising a series connection of a diode and a variable resistor connected in parallel with said electromagnet to adjustably control the current flow through said electromagnet and effect deenergization of said electromagnet when the current falls below a predetermined value.

* * * * *